(12) United States Patent
Foral et al.

(10) Patent No.: US 10,612,574 B1
(45) Date of Patent: Apr. 7, 2020

(54) INSULATION RETAINER CLIP

(71) Applicants: Joseph J. Foral, Blair, NE (US); Rene Barrera, Bennington, NE (US)

(72) Inventors: Joseph J. Foral, Blair, NE (US); Rene Barrera, Bennington, NE (US)

( * ) Notice: Subject to any disclaimer, the term of this patent is extended or adjusted under 35 U.S.C. 154(b) by 0 days.

(21) Appl. No.: 16/379,088

(22) Filed: Apr. 9, 2019

(51) Int. Cl.
*F16B 2/24* (2006.01)
*F16B 5/06* (2006.01)

(52) U.S. Cl.
CPC .............. *F16B 2/24* (2013.01); *F16B 5/0692* (2013.01)

(58) Field of Classification Search
CPC ...... F16B 2/24; F16B 5/0692; E04F 13/0864; E04F 13/0803; E04C 2/292; E04B 1/762
USPC ....... 52/404.1, 404.3, 404.4, 506.01, 506.05, 52/511, 512, 579
See application file for complete search history.

(56) References Cited

U.S. PATENT DOCUMENTS

| | | | | |
|---|---|---|---|---|
| 2,582,144 A * | 1/1952 | Miles | ...................... | E04C 2/243 52/404.1 |
| 4,037,379 A * | 7/1977 | Ozanne | .................. | E04C 2/3405 52/404.3 |
| 4,375,741 A * | 3/1983 | Paliwoda | ............ | E04D 13/1625 52/109 |
| 4,467,504 A * | 8/1984 | Quist | ...................... | E04H 15/64 160/395 |
| 4,471,592 A * | 9/1984 | MacKinnon, Jr. | .... | E04B 1/7608 52/361 |
| 4,641,473 A * | 2/1987 | Trezza | ................ | E04F 13/0846 52/410 |
| 5,216,859 A * | 6/1993 | Moreno | ................ | E04B 2/7411 52/238.1 |
| 5,970,671 A * | 10/1999 | Bifano | .................... | E04B 1/765 428/603 |
| 6,253,516 B1 * | 7/2001 | D'Andrea | ............. | E04B 2/7854 52/220.7 |
| 6,383,594 B2 * | 5/2002 | Weinstein | ................ | B32B 5/26 428/43 |
| 6,594,965 B2 * | 7/2003 | Coulton | ............... | E04B 1/7046 52/302.1 |
| 6,670,011 B2 * | 12/2003 | Weinstein | ................ | B32B 5/26 428/43 |
| 6,694,694 B2 * | 2/2004 | Zeeff | ......................... | E04C 2/08 52/506.01 |
| 8,079,188 B2 * | 12/2011 | Swartz | ...................... | E04H 9/10 52/167.1 |
| 8,161,705 B2 * | 4/2012 | Pratt | ................... | E04F 13/0803 52/238.1 |
| 8,429,866 B2 * | 4/2013 | Knight | ..................... | E04B 2/58 52/479 |
| 8,621,810 B2 * | 1/2014 | Manser | ................. | E04B 1/4178 52/506.05 |
| 8,813,451 B2 * | 8/2014 | Foral | ........................ | E04B 1/38 52/478 |
| 8,820,476 B2 * | 9/2014 | Nam | ..................... | E04B 2/7409 181/284 |
| 8,839,587 B2 * | 9/2014 | Hohmann, Jr. | ....... | E04B 1/4178 52/509 |

(Continued)

*Primary Examiner* — Brian E Glessner
*Assistant Examiner* — Adam G Barlow
(74) *Attorney, Agent, or Firm* — Dennis L. Thomte; Thomte Patent Law Office LLC

(57) ABSTRACT

A clip is provided for use in retaining insulation in place during the construction of a wall. The clip of this invention is designed so as to be secured to a Z girt and so as to extend over the lower end of an insulation sheet thereabove.

7 Claims, 10 Drawing Sheets

(56) References Cited

U.S. PATENT DOCUMENTS

| | | | |
|---|---|---|---|
| 8,991,127 B2* | 3/2015 | Todd | E04F 13/0805 |
| | | | 52/506.06 |
| 9,951,517 B2 | 4/2018 | Foral | |
| 2002/0073641 A1* | 6/2002 | Menchetti | E04B 2/7411 |
| | | | 52/404.1 |
| 2004/0194422 A1* | 10/2004 | Rodenhouse | E04F 13/045 |
| | | | 52/741.1 |
| 2005/0076611 A1* | 4/2005 | Crawford | E04B 1/762 |
| | | | 52/782.1 |
| 2007/0068104 A1* | 3/2007 | Weir | B32B 5/245 |
| | | | 52/404.1 |
| 2007/0204541 A1* | 9/2007 | Sade | E04B 2/707 |
| | | | 52/302.1 |
| 2008/0010932 A1* | 1/2008 | Elliott | E04B 2/7457 |
| | | | 52/404.1 |
| 2018/0303230 A1* | 10/2018 | Haas | A45F 5/021 |

* cited by examiner

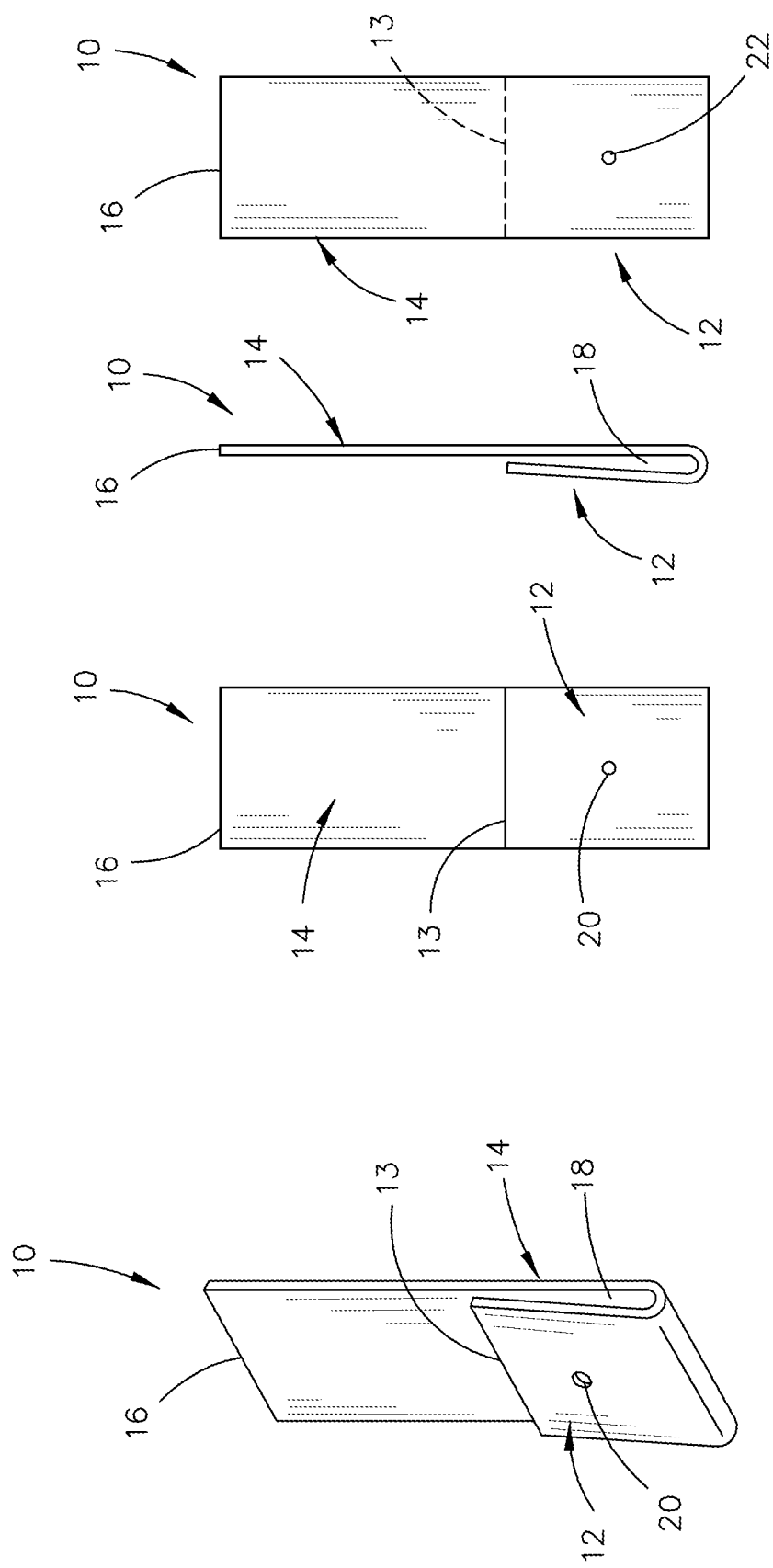

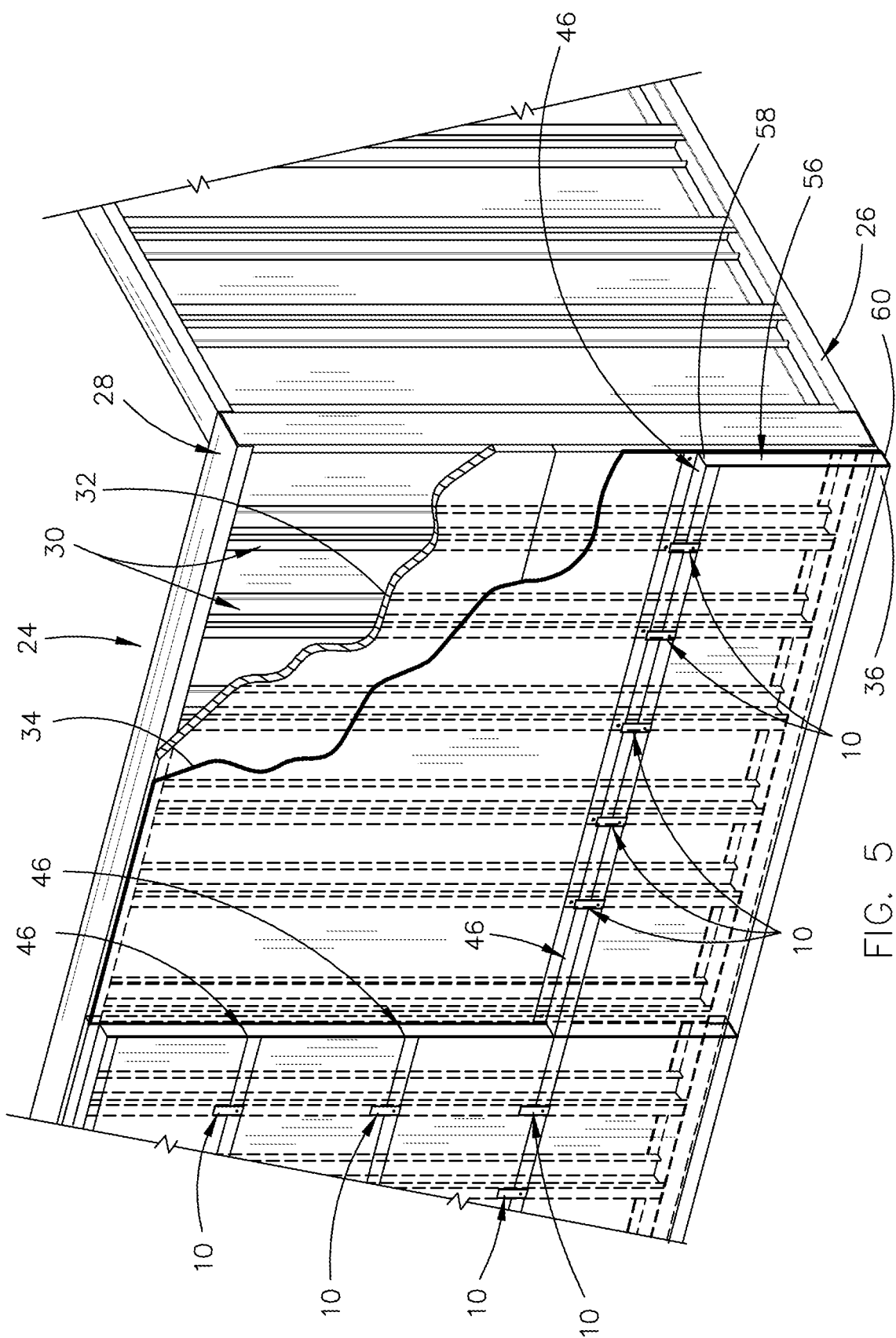

INSULATION RETAINER CLIP

Your Petitioners, JOSEPH J. FORAL, a citizen of the United States and a resident of the State of Nebraska, whose post office address is 1227 Pinewood Drive, Blair, Nebr. 68008 and RENE BARRERA, a citizen of the United States and a resident of the State of Nebraska, whose post office address is 11905 No. 157th Street, Bennington, Nebr. 68007 pray that Letters Patent may be granted to them for the invention set forth in the following specification.

BACKGROUND OF THE INVENTION

Field of the Invention

This invention relates to a clip which is used to retain insulation in place during the construction of a wall. Even more particularly, this invention relates to a clip which is used to retain insulation in place before materials are placed over the insulation.

Description of the Related Art

During the construction of a wall, vertically disposed and horizontally spaced-apart studs are secured to a bottom plate and a top plate and extend therebetween. Sheeting is secured to the outer side of the studs and a weather barrier is placed over the exterior of the sheeting. Elongated and horizontally disposed Z girts are then secured to the studs in a vertically spaced-apart manner. Insulation is then positioned between the Z girts. The problem arises as to how to retain the insulation in place in the Z girts until exterior cladding is placed on the exterior of the wall. Many attempts have been made to provide devices to retain the insulation in place but, to the best of Applicant's knowledge, the prior art insulation retaining devices are expensive and difficult to install. Further, the prior art retainer devices do not function properly.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A clip is provided for retaining insulation in place on a wall under construction before other materials are positioned outwardly of the insulation. The clip of this invention includes a clip attachment and a blade with the clip attachment being bent over one end of the blade to create a space therebetween. The clip is mounted on Z girts so as to extend over the insulation sheets thereabove thereby maintaining the insulation sheets in place. A second and third embodiment of the clip of this invention is also shown and described.

A principal object of the invention is to provide a clip for retaining insulation in place before other materials are positioned on the outer sides of the insulation.

A further object of the invention is to provide a clip of the type described which is easy to install and which is inexpensive.

Yet another object of the invention is to provide a clip of the type described which does not interfere with the installation of cladding materials.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 is a perspective view of one embodiment of the insulation retaining device;

FIG. 2 is a back view of the clip of FIG. 1;

FIG. 3 is a side view of the slip of FIG. 1;

FIG. 4 is a front view of the clip of FIG. 1;

FIG. 5 is a partial perspective view of a wall assembly under construction which employs the clip of this invention;

DESCRIPTION OF THE PREFERRED EMBODIMENT

Figure 6:
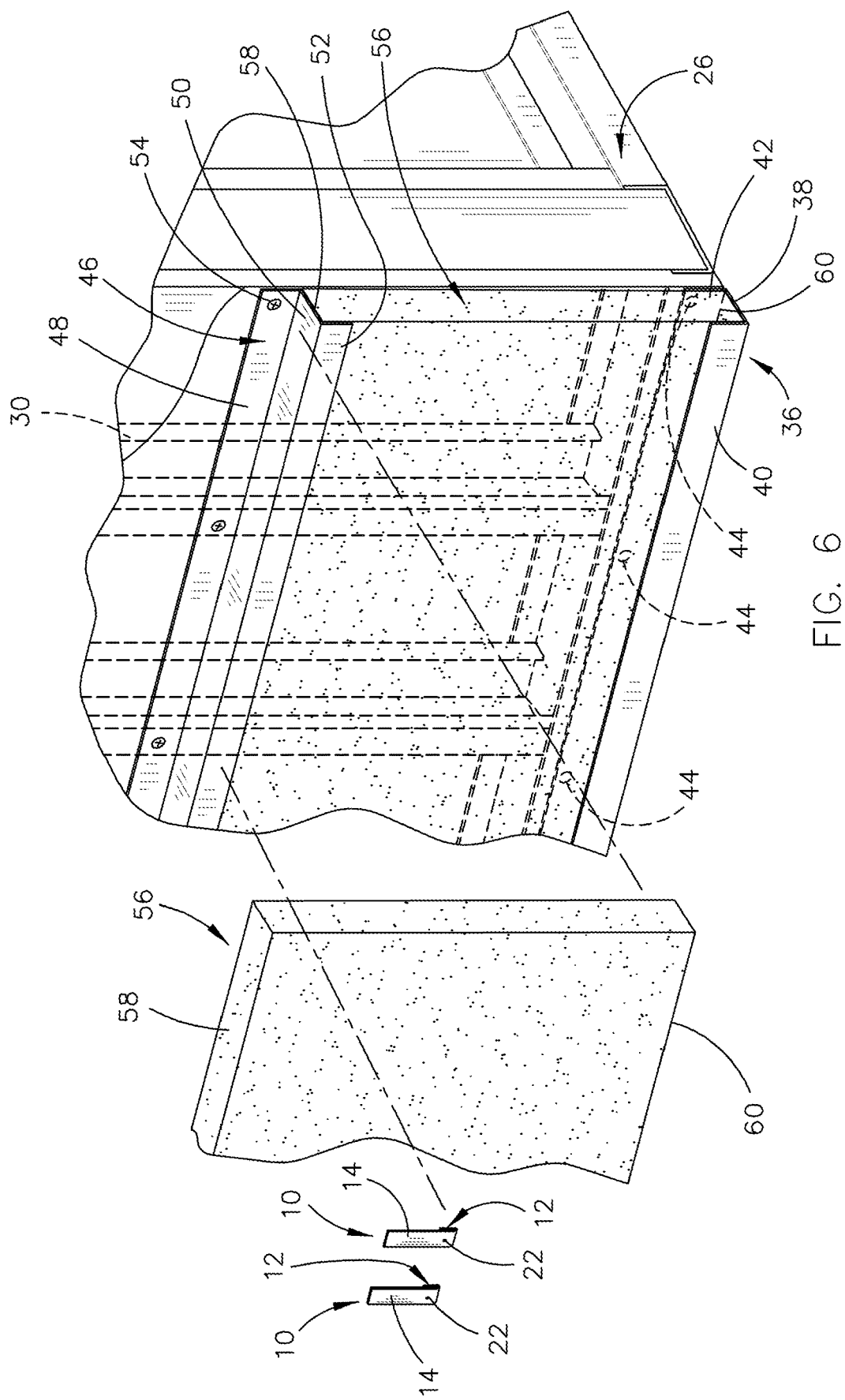
FIG. 6 is a partial exploded perspective view of a pair of clips of this invention and the manner in which they are used.
Figure 7:
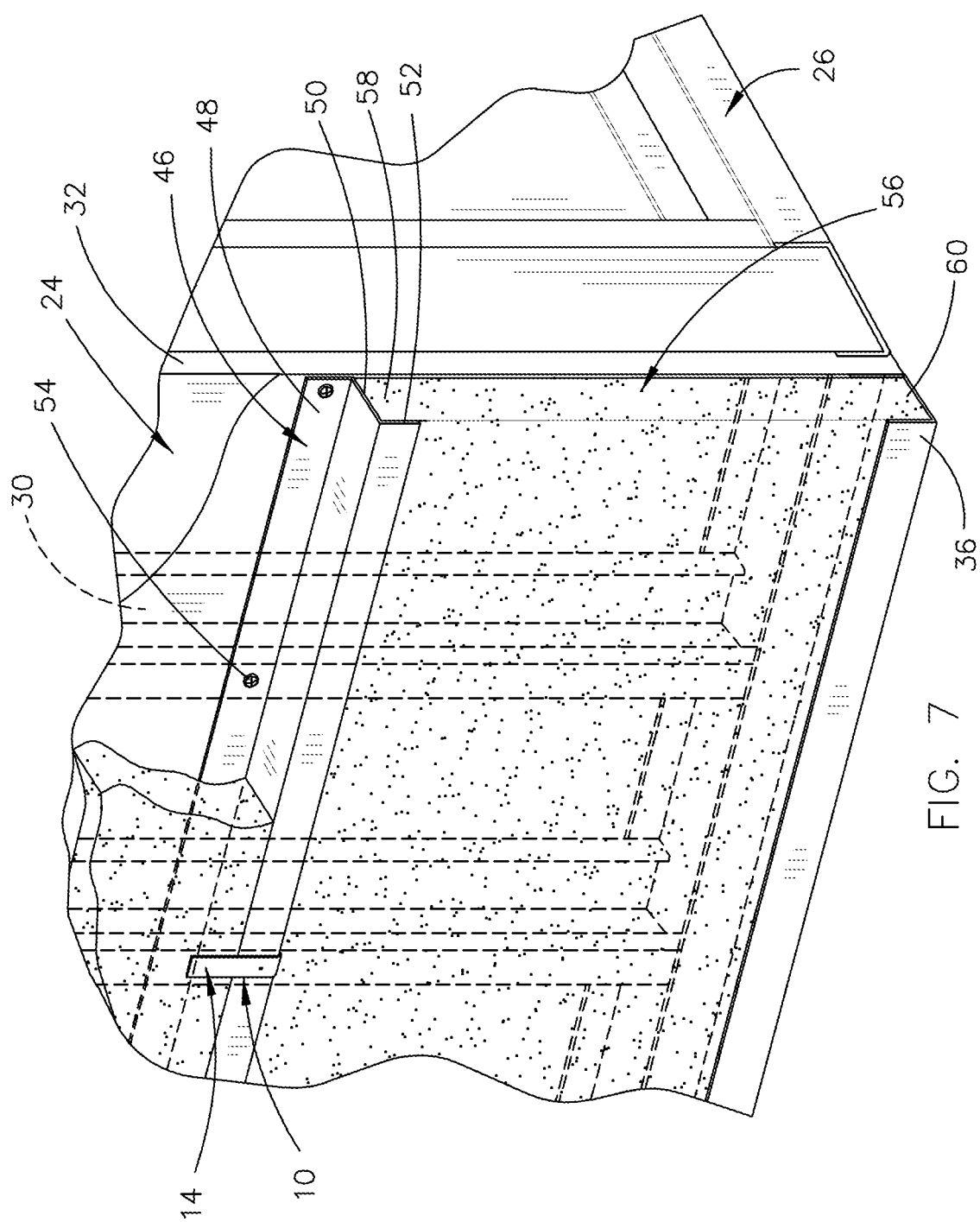
FIG. 7 is a partial perspective view which illustrates one of the clips of this invention being used to retain the lower end of insulation on a Z girt.
Figure 8:
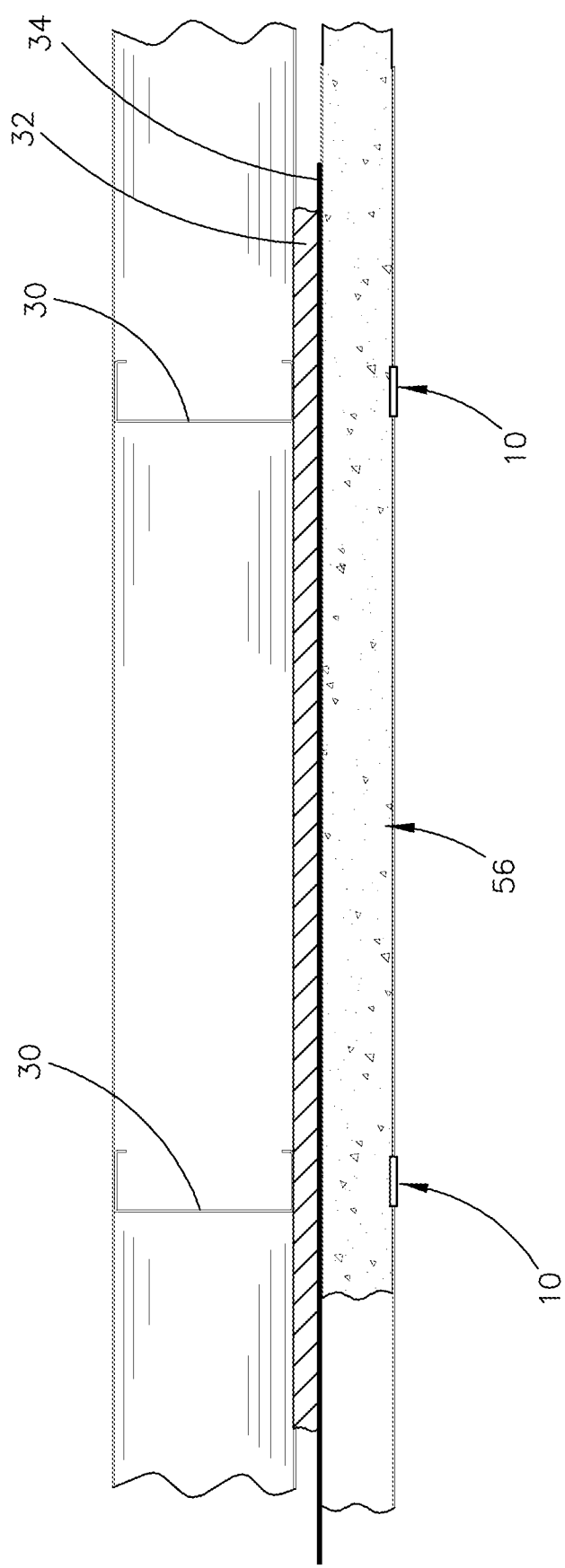
FIG. 8 is a partial sectional view illustrating insulation being retained in place by a pair of clips of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The clip of this invention is referred to by the reference numeral 10. Clip 10 is formed of steel or aluminum. Clip 10 includes a clip attachment 12 and a long leg or blade 14 having an end 16. Clip attachment 12 has an end 16. Clip attachment 12 and leg 14 define a space 18 therebetween. An optional screw opening 20 is formed in clip attachment 12. As seen in FIGS. 1 and 3, the end 13 of clip attachment 12 is spaced from leg 14. As seen in FIG. 4, leg 14 has an optional screw opening 22 formed therein which registers with screw opening 20.

Figure 12:
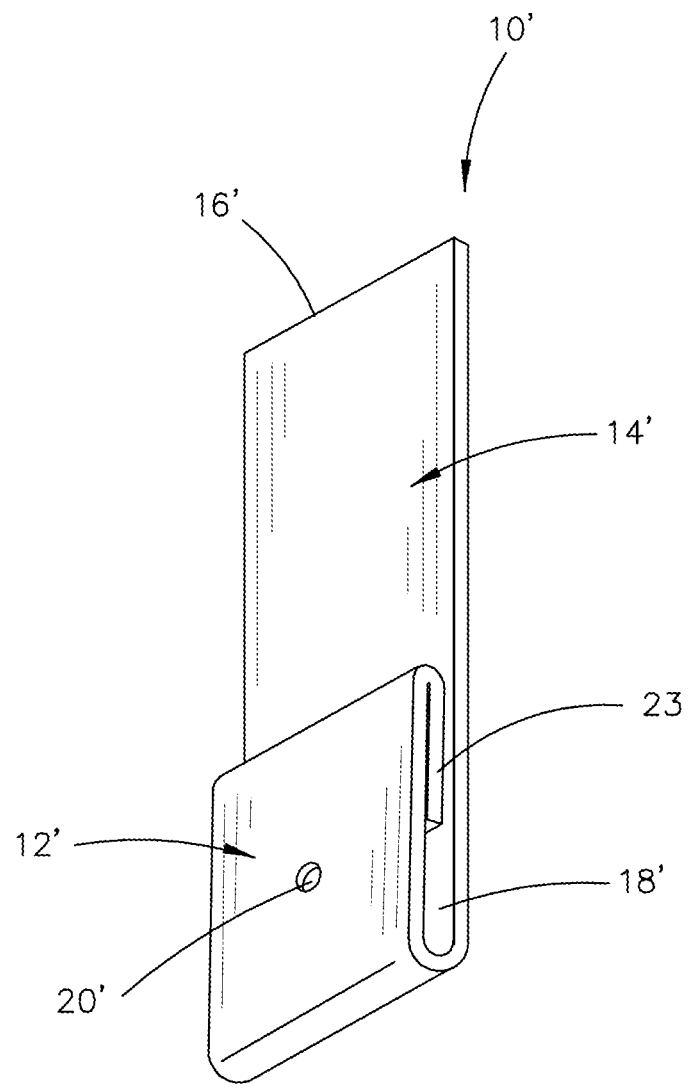
FIG. 12 is a perspective view of a second embodiment of the clip of this invention.
Figure 13:
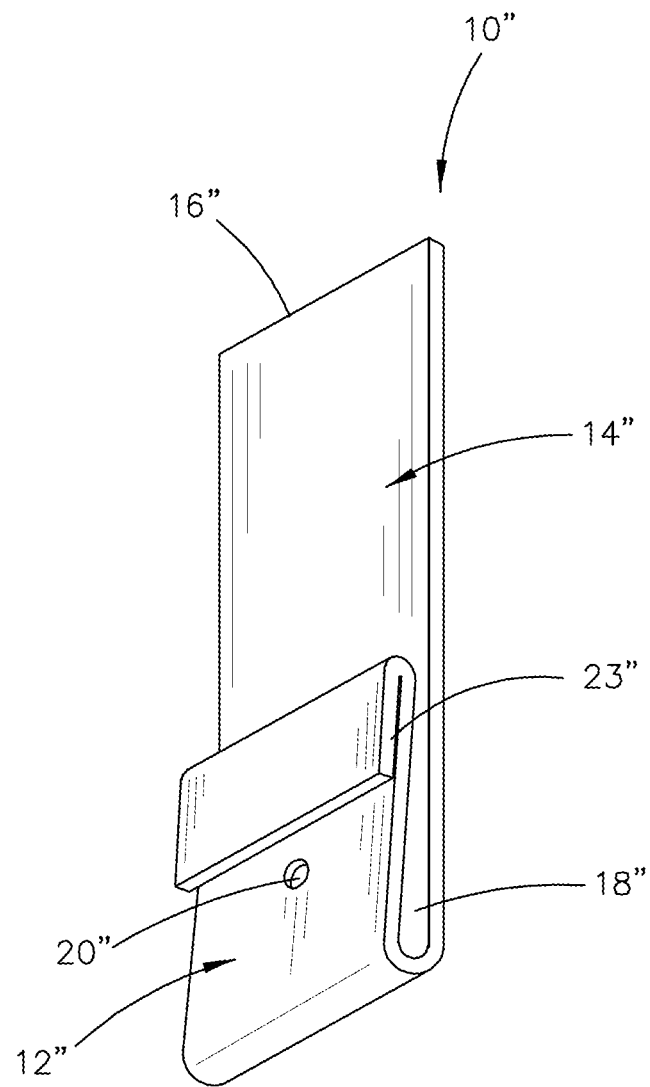
FIG. 13 is a perspective view of a third embodiment of the clip of this invention.

FIG. 12 is a perspective view of a second embodiment of the clip of this invention and which is identified by the reference numeral 10'. Inasmuch as clip 10' is substantially identical to clip 10, identical structure on clip 10' will be designated with "'". Clip 10' is identical to clip 10 except that clip attachment 12' has a return portion 22' which extends into space 18'. FIG. 13 is a perspective view of a third embodiment of the clip of this invention and which is identified by the reference numeral 10". Inasmuch as clip 10" is substantially identical to clip 10, identical structure on clip 10" will be designated with " " ". Clip 10" is identical to clip 10 except that clip attachment 12" has a return portion 22" which is positioned on the outer side of clip attachment 12".

FIG. 5 illustrates a wall 24 under construction. Wall 24 includes a bottom or base plate 26, a top plate 28 and a plurality of studs 30 which extend vertically between plates 26 and 28 in a horizontally spaced-apart manner. The plates 26, 28 and studs 30 may be comprised of steel, aluminum or wood. The numeral 32 refers to conventional sheeting which is positioned at the outer sides of the studs 30 and which is secured thereto in conventional fashion. Sheeting 32 may be comprised of plywood, gypsum, etc. A conventional weather barrier 34 is positioned at the outer or exterior side of the sheeting 32 in conventional fashion. In some installations, the weather barrier 34 may not be required. An elongated and generally U-shaped channel 36 which includes a base portion 38, an upstanding outer wall 40 and an upstanding inner wall 42 is secured to bottom plate 26 by a plurality of screws 44.

A plurality of elongated and horizontally disposed Z girts 46, which are comprised of steel or aluminum, are secured to the studs 30 in a vertically spaced-apart manner above the channel 36. Each of the Z girts 46 have a vertically disposed upper portion 48, a horizontally disposed wall portion 50 extending outwardly from the lower end of upper portion 48 and a vertically disposed outer wall 52 extending downwardly from the outer end of wall portion 50. The Z girts 46 are secured to the studs 30 by screws 54.

In FIGS. 1-10, the numeral refers to insulation sheets 56 which are vertically disposed and which have an upper end 58 and a lower end 60. The insulation sheets 56, which have any length, are positioned at the outer side of the weather barrier 34 in a vertically disposed manner and in an end-to-end manner. Although the specification states that insulation sheets are positioned in an end-to-end manner in the rows, a single insulation sheet could be substituted for the plurality of insulation sheets in a particular row of insulation. The lowermost row of insulation sheets 56 have their lower ends 60 received in channel 36. Normally, the upper ends 58 of the lowermost insulation sheets 56 will be in a vertical position before a Z girt 46 is secured to the studs 30 at the upper ends 58 of insulation sheets 56. When the upper ends 58 of the lowermost insulation sheets 56 are in position, a Z girt 46, which is the lowermost Z girt 46, will be secured to the studs 30 so that the outer wall 52 of the Z girt 46 will be positioned outwardly of the upper ends 58 of the insulation sheets 56 as seen in FIG. 6. A plurality of Z girts 46 will then be secured to the studs 30 in a horizontally disposed and vertically spaced-apart manner above the lowermost Z girt 46.

Figure 9:
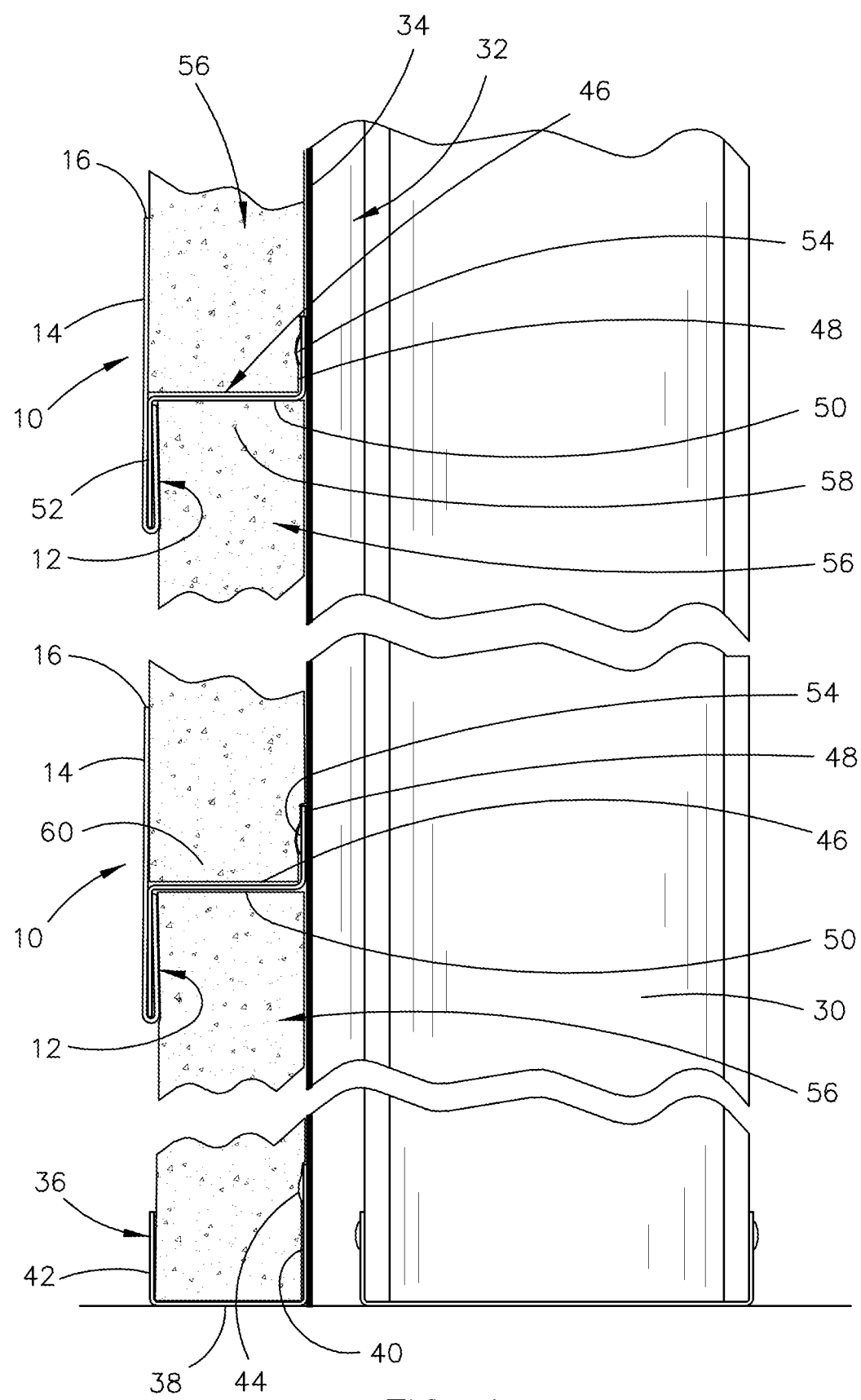
FIG. 9 is a partial side view illustrating a pair of clips of this invention, each of which are retaining insulation in place on a Z girt.
Figure 10:
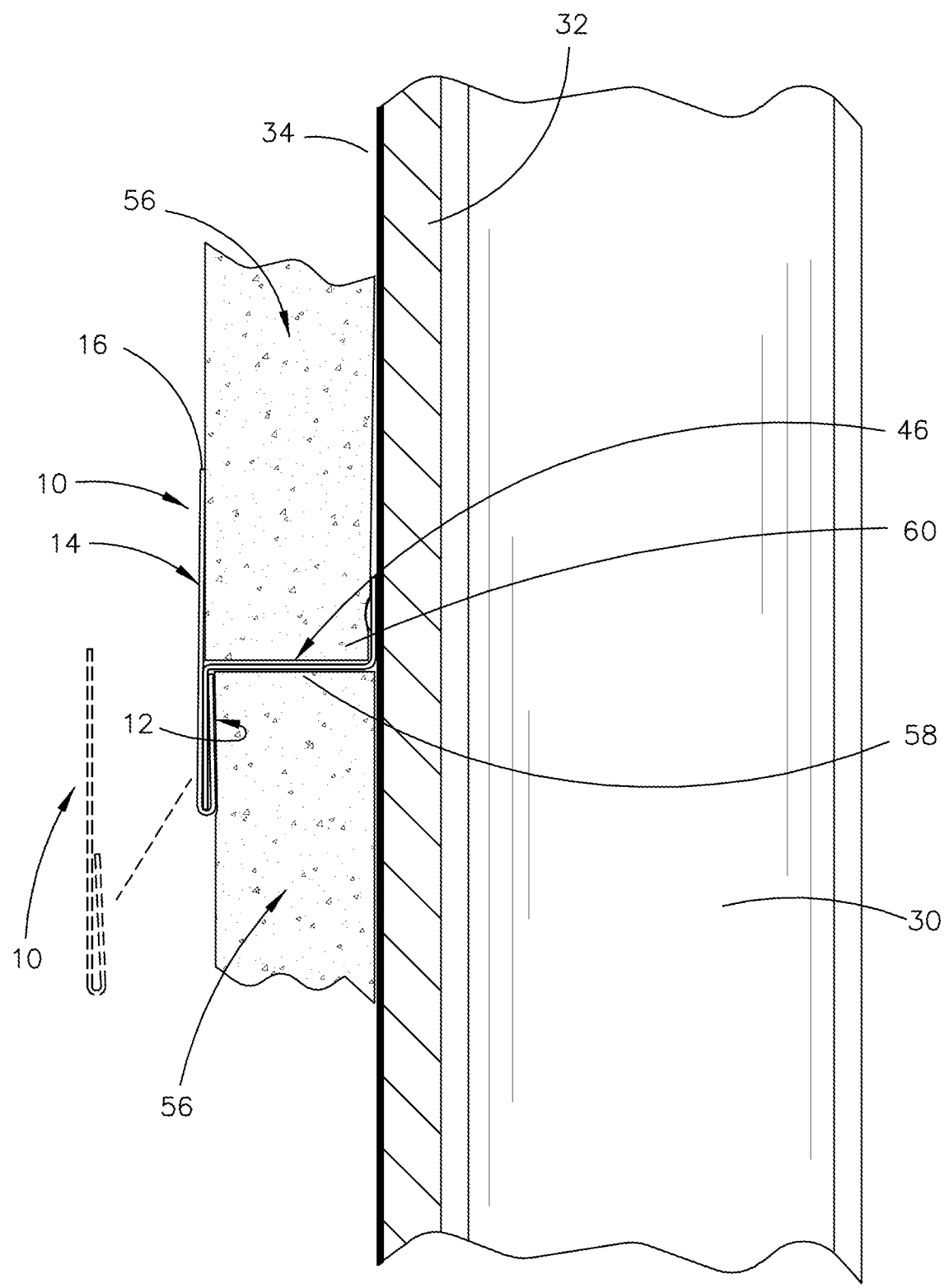
FIG. 10 is a partial side view similar to FIG. 9 which illustrates the manner in which the clip of this invention is mounted on a Z girt.

The next row of insulation sheets 56 above the lowermost row of insulation sheets 56 have their upper ends 58 thereof received between the inner surface of the outer wall 52 of the Z girt 46 thereof and below the wall portion 50 thereof. The lower ends 60 of the insulation sheets 56 rest upon the wall portion 50 of the Z girt 46 therebelow. A plurality of clips 10 are then secured to the lower end of outer wall 52 as seen in FIG. 9 so that the blades 14 of the clips 10" engage the outer side of the lower end of the insulation sheets 56 to maintain the insulation sheets 56 in position. The installation process is continued as set forth above until the wall 24 is fully constructed. Once completed, cladding may be positioned at the outer sides of the insulation sheets 56 in conventional fashion.

If desired, self-tapping screws may be extended through opening 22 in blade 14 and through opening 20 in blade attachment 12. In any case, the clip attachment 12 and the blade 14 frictionally embrace the lower portion 52 of the respective Z girt 46. If the clip 10' is used, the return 23' adds to the frictional engagement of the clip 10' to the lower portion 52 of the respective Z girt 46. If the clip 10" is employed, the return 23" engages the associated insulation sheets 56 to maintain the clip 10" in place.

The use of clips 10, 10' and 10" in combination with the Z girts 46, maintain the insulation sheets 56 in place before materials such as cladding are placed over the insulation. The clips 10, 10' and 10" do not interfere with materials being placed thereover.

It can therefore be seen that a novel clip 10 has been provided for maintaining or retaining the insulation sheets 56 in place prior to other materials being placed over the insulation sheets 56.

Figure 11:
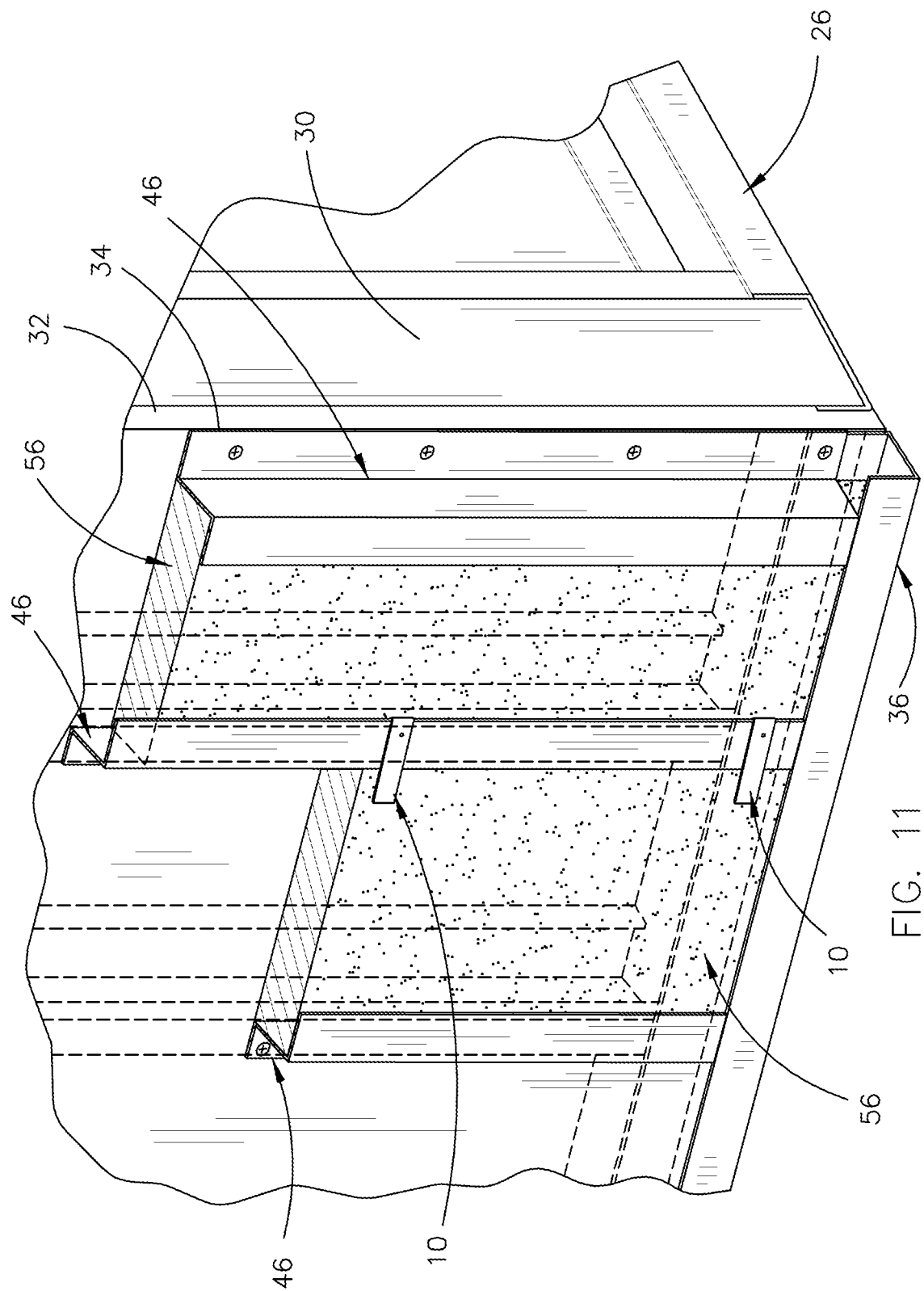
FIG. 11 is a partial side view of the clips of this invention maintaining vertically disposed sheets of insulation.

FIG. 11 is a partial perspective view of a wall system wherein the Z girts 46 are vertically disposed and horizontally spaced-apart and wherein the insulation sheets 56 are vertically disposed. In FIG. 11, the right-hand Z girt 46 would be installed first on a stud 30. An insulation sheet 56 would be positioned so that one side, or end, would be positioned with respect to the right-hand Z girt 46. After the insulation sheets 56 are so positioned, the Z girt 46 to the left of the right-hand Z girt would be attached to a stud 30.

A second Z girt 46 would then be secured to a stud 30 to the left of the first Z girt 46. The left side or end of a second insulation sheet 36 would be positioned in the second Z girt 46 as seen in FIG. 11. Clips 10 would then be secured to first Z girt 46 as illustrated in FIG. 11 so the blades of the clips 10 extend over the free end of the second insulation sheet 56 to maintain the second insulation sheet 56 in place. The proceeding is repeated until the outer side of the wall is covered by insulation.

Although the wall assembly is shown to include studs, sheeting and a weather barrier, the wall assembly could be constructed without the sheeting and weather barrier. Further, the wall could be constructed of a pre-east material or concrete blocks. In such a case, the Z girts 46 would be secured to the exterior of the pre-cast material or the concrete block.

Further, although the Z girts 46 are described as being comprised of steel or aluminum, the Z girts 46 may be comprised of fiberglass or the like.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A wall assembly, comprising:
a horizontally disposed bottom plate;
a horizontally disposed top plate;

a plurality of vertically disposed studs secured to said bottom and top plates in a horizontally spaced-apart manner;
each of said studs having an interior side and an exterior side;
sheeting material secured to said exterior sides of said studs;
said sheeting material having an interior side and an exterior side;
a weather barrier secured to said exterior side of said sheeting material;
said weather barrier having an interior side and an exterior side;
an elongated and generally U-shaped channel member positioned outwardly of said exterior side of said weather barrier and outwardly of said bottom plate;
said channel member being secured to said bottom plate;
an elongated and horizontally disposed first Z girt secured to said studs and being positioned outwardly of said weather barrier;
said first Z girt being positioned above said U-shaped channel member;
said first Z girt, including a vertically disposed upper portion having upper and lower ends, a horizontally disposed wall portion, having inner and outer ends, extending outwardly from said lower end of said upper portion and a vertically disposed outer wall portion, having upper and lower ends, extending downwardly from said outer end of said horizontally disposed wall portion;
a plurality of vertically disposed first insulation sheets having an upper end and a lower end;
said first insulation sheets being positioned at said exterior side of said weather barrier in an end-to-end manner;
said lower ends of said first insulation sheets being received in said channel member;
said upper ends of said first insulation sheets being received in said first Z girt inwardly of said outer wall portion thereof;
an elongated and horizontally disposed second Z girt, identical to said first Z girt, secured to said studs so as to be positioned above said first Z girt;
a plurality of second insulation sheets, having upper and lower ends;
said lower ends of said second insulation sheet members being positioned on said horizontally disposed wall portion of said first Z girt;
said upper ends of said second insulation sheet members being received by said second Z girt inwardly of said outer wall of said second Z girt; and
a plurality of insulation retainer clips secured to said outer wall of said first Z girt which extends upwardly therefrom outwardly of said lower ends of said second insulation sheet members to maintain said second insulation sheet members in position before materials are placed over said first and second insulation sheet members.

2. A wall assembly, comprising:
a horizontally disposed bottom plate;
a horizontally disposed top plate;
a plurality of vertically disposed studs secured to said bottom and top plates in a horizontally spaced-apart manner;
each of said studs having an interior side and an exterior side;
sheeting material secured to said exterior sides of said studs;
said sheeting material having an interior side and an exterior side;
a weather barrier secured to said exterior side of said sheeting material;
said weather barrier having an interior side and an exterior side;
an elongated and generally U-shaped channel member positioned outwardly of said exterior side of said weather barrier and outwardly of said bottom plate;
said channel member being secured to said bottom plate;
a plurality of horizontally disposed and elongated Z girts positioned outwardly of said exterior side of said weather barrier and being secured to said studs so as to be vertically spaced-apart and positioned above said bottom plate;
a plurality of vertically disposed insulation sheets having an upper end and a lower end;
said insulation sheets being positioned at said exterior side of said weather barrier in a vertically spaced-apart manner;
the lower end of the lowermost insulation sheets being received in said channel member;
the upper end of the lowermost insulation sheets being received in a Z girt;
said insulation sheets above the lower insulation sheets being positioned between upper and lower Z girts; and
a plurality of insulation retainer clips secured to some of said Z girts to maintain said insulation sheets thereabove in position before materials are placed over said insulation sheets.

3. A wall assembly, comprising:
a horizontally disposed bottom plate;
a horizontally disposed top plate;
a plurality of vertically disposed studs secured to said bottom and top plates in a horizontally spaced-apart manner;
each of said studs having an interior side and an exterior side;
sheeting material secured to said exterior sides of said studs;
said sheeting material having an interior side and an exterior side;
a weather barrier secured to said exterior side of said sheeting material;
said weather barrier having an interior side and an exterior side;
an elongated and generally U-shaped channel member positioned outwardly of said exterior side of said weather barrier and outwardly of said bottom plate;
said channel member being secured to said bottom plate;
an elongated and horizontally disposed first Z girt secured to said studs above said U-shaped channel member;
an elongated and horizontally disposed second Z girt secured to said studs above said first Z girt;
an elongated and horizontally disposed third Z girt secured to said studs above said second Z girt;
an elongated and horizontally disposed fourth Z girt secured to said studs above said third Z girt;
an elongated and horizontally disposed fifth Z girt secured to said studs above said fourth Z girt;
each of said first, second, third, fourth and fifth Z girts including a vertically disposed upper portion, having upper and lower ends, a horizontally disposed wall portion, having inner and outer ends, which extends outwardly from said lower end of said upper portion thereof and a vertically disposed outer wall portion, having upper and lower ends, which extends downwardly from said outer end of said horizontally disposed wall portion;
a plurality of vertically disposed first insulation sheets having an upper end and a lower end;
said first insulation sheets being positioned at said exterior side of said weather barrier in an end-to-end manner;
said lower ends of said first insulation sheets being received in said channel member;
said upper ends of said first insulation sheets being received in said first Z girt inwardly of said outer wall portion thereof;
a plurality of second insulation sheets, having upper and lower ends;
said lower ends of said second insulation sheet members being positioned on said horizontally disposed wall portion of said first Z girt;
said upper ends of said second insulation sheet members being received by said second Z girt inwardly of said outer wall of said second Z girt;
a plurality of third insulation sheets, having upper and lower ends;
said lower ends of said third insulation sheets being positioned on said horizontally disposed wall portion of said second Z girt;
said upper ends of said third insulation sheets being received by said third Z girt inwardly of said outer wall portion thereof;
a plurality of fourth insulation sheets, having upper and lower ends;
said lower ends of said fourth insulation sheets being positioned on said horizontally disposed wall portion of said third Z girt;
said upper ends of said fourth insulation sheets being received by said fourth Z girt inwardly of said outer wall portion thereof;
a plurality of fifth insulation sheets, having upper and lower ends;
said lower ends of said fifth insulation sheets being positioned on said horizontally disposed wall portion of said fourth Z girt;
said upper ends of said fifth insulation sheets being received by said fifth Z girt inwardly of said outer wall portion thereof;
a plurality of insulation retainer clips secured to said outer wall portion of said first Z girt which extend upwardly therefrom outwardly of said lower ends of said second insulation sheets to retain said second insulation sheets in position;
a plurality of insulation retainer clips secured to said outer wall portion of said second Z girt which extend upwardly therefrom outwardly of said lower ends of said third insulation sheets to retain said third insulation sheets in position;
a plurality of insulation retainer clips secured to said outer wall portion of said third Z girt which extend upwardly therefrom outwardly of said lower ends of said fourth insulation sheets to retain said fourth insulation sheets in position; and
a plurality of insulation retainer clips secured to said outer wall portion of said fourth Z girt which extend upwardly therefrom outwardly of said lower ends of said fifth insulation sheets to retain said fifth insulation sheets in position.

4. The wall assembly of claim 3 wherein said insulation retainer clips frictionally engage the outer wall portions of the respective Z girt.

5. The wall assembly of claim 3 wherein each of said insulation retainer clips comprise:
an elongated flat blade portion having a first end, a second end, an outer surface and an inner surface;
a clip attachment portion extending from said second end of said flat blade portion so as to be positioned at said inner surface of said flat blade portion;
said clip attachment portion having inner and outer sides;
said inner surface of said clip attachment portion and said inner surface of said flat blade portion being spaced-apart so as to define a space therebetween;
said clip attachment portion having a length which is shorter than the length of said flat blade portion; and
said flat blade portion and said clip attachment portion being configured to frictionally receive a portion of a Z girt in said space therebetween.

6. In combination:
a vertically disposed wall structure having a lower end, an upper end, an inner side and an outer side;
a plurality of horizontally disposed and elongated lower Z girts secured to said outer side of said vertically disposed wall structure in a vertically spaced-apart manner;
a plurality of horizontally disposed and elongated upper Z girts secured to said outer side of said vertically disposed wall structure in a vertically spaced-apart manner;
a plurality of vertically disposed insulation sheets having, an upper end and a lower end;
said insulation sheets being positioned at said outer side of said wall in a vertically spaced-apart manner;
said upper ends of said insulation sheets being received in said upper Z girts;
said lower ends of said insulation sheets being positioned on said lower Z girts; and
a plurality of insulation retainer clips secured to said lower Z girts which extend upwardly therefrom for engagement with the lower ends of the insulation sheets thereabove to maintain said insulation sheets in position before materials are placed over said insulation sheets.

7. A wall assembly, comprising:
a horizontally disposed bottom plate;
a horizontally disposed top plate;
a plurality of vertically disposed studs secured to said bottom and top plates in a horizontally spaced-apart manner;
each of said studs having an interior side and an exterior side;
sheeting material secured to said exterior sides of said studs;
said sheeting material having an interior side and an exterior side;
a weather barrier secured to said exterior side of said sheeting material;
said weather barrier having an interior side and an exterior side;
an elongated and generally U-shaped channel member positioned outwardly of said exterior side of said weather barrier and outwardly of said bottom plate;
said channel member being secured to said bottom plate;
a plurality of vertically disposed and elongated Z girts positioned outwardly of said exterior side of said weather barrier and being secured to said studs so as to be horizontally spaced-apart and positioned above said bottom plate;

a plurality of vertically disposed insulation sheets having an upper end, a lower end, a first side and a second side;

said insulation sheets being positioned at said exterior side of said weather barrier in a horizontally spaced-apart manner;

the lower end of the lowermost insulation sheets being received in said channel member;

the first side of the lowermost insulation sheets being received in a Z girt;

the second side of the lowermost insulation sheets being received in a Z girt; and a plurality of insulation retainer clips secured to some of said Z girts to maintain said insulation sheets in position before materials are placed over said insulation sheets.

\* \* \* \* \*